United States Patent
Tiihonen et al.

(10) Patent No.: US 9,255,012 B2
(45) Date of Patent: Feb. 9, 2016

(54) METHOD FOR RECOVERING LITHIUM CARBONATE

(71) Applicant: Outotec (Finland) Oy, Espoo (FI)

(72) Inventors: Marika Tiihonen, Espoo (FI); Liisa Haavanlammi, Espoo (FI)

(73) Assignee: Outotec (Finland) Oy, Espoo (FI)

( * ) Notice: Subject to any disclaimer, the term of this patent is extended or adjusted under 35 U.S.C. 154(b) by 0 days.

(21) Appl. No.: 14/385,561

(22) PCT Filed: Mar. 19, 2013

(86) PCT No.: PCT/FI2013/050307
§ 371 (c)(1),
(2) Date: Sep. 16, 2014

(87) PCT Pub. No.: WO2013/140039
PCT Pub. Date: Sep. 26, 2013

(65) Prior Publication Data
US 2015/0044124 A1 Feb. 12, 2015

(30) Foreign Application Priority Data
Mar. 19, 2012 (FI) ..................... 20125302

(51) Int. Cl.
| | |
|---|---|
| *C01D 15/00* | (2006.01) |
| *C01D 15/08* | (2006.01) |
| *C22B 26/12* | (2006.01) |
| *B01D 9/00* | (2006.01) |
| *B01J 10/00* | (2006.01) |

(52) U.S. Cl.
CPC *C01D 15/08* (2013.01); *B01D 9/00* (2013.01); *B01J 10/00* (2013.01); *C22B 26/12* (2013.01)

(58) Field of Classification Search
None
See application file for complete search history.

(56) References Cited

U.S. PATENT DOCUMENTS

| | | | |
|---|---|---|---|
| 3,112,172 A | | 11/1963 | Archambault et al. |
| 3,131,022 A | | 4/1964 | Archambault et al. |
| 3,857,920 A | * | 12/1974 | Grantham et al. .......... 423/179.5 |
| 4,124,684 A | | 11/1978 | Olivier et al. |
| 6,048,507 A | | 4/2000 | Amouzegar et al. |
| 2004/0005267 A1 | | 1/2004 | Boryta et al. |
| 2011/0318253 A1 | * | 12/2011 | Tiihonen ...................... 423/422 |

FOREIGN PATENT DOCUMENTS

| | | |
|---|---|---|
| CN | 101948124 B | 1/2011 |
| FI | 121785 B1 | 4/2011 |
| WO | 2011082444 A1 | 7/2011 |
| WO | 2011103298 A2 | 8/2011 |

OTHER PUBLICATIONS

Search report issued in Finnish patent application serial No. 20125302, dated Jan. 17, 2013, 2 pgs.
Olivier, C.A. and Nenniger, E.H., "Continuous process for the production of lithium carbonate", CIM Bulletin, vol. 72, No. 807, Jul. 1979, pp. 131-136.

* cited by examiner

*Primary Examiner* — Steven Bos
(74) *Attorney, Agent, or Firm* — Chernoff, Vilhauer, McClung & Stenzel, LLP

(57) ABSTRACT

A method and arrangement for recovering lithium carbonate from a raw material containing lithium, which method comprises pulping (1) the raw material containing lithium in the presence of water and sodium carbonate for producing a slurry containing lithium from the raw material containing lithium. After pulping the lithium-containing slurry is leached (2) for dissolving the lithium in the solution thus producing a solution containing lithium carbonate. After pulping and leaching the method comprises carbonating (3) the solution containing lithium carbonate by using carbon dioxide under atmospheric conditions for producing a solution containing lithium bicarbonate and separating (4) the solids form the solution. The solution containing lithium bicarbonate is purified (5) to produce a purified solution containing lithium bicarbonate, and recovering by crystallizing (6) lithium carbonate from the purified lithium bicarbonate-containing solution.

8 Claims, 1 Drawing Sheet

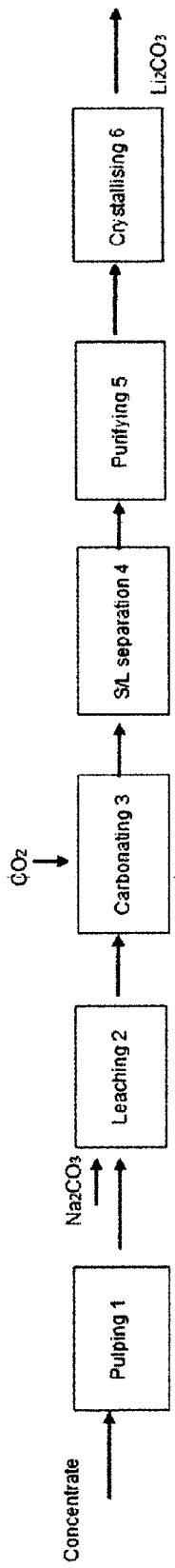

METHOD FOR RECOVERING LITHIUM CARBONATE

FIELD OF THE INVENTION

The present invention relates to a method and an arrangement for recovering lithium carbonate.

BACKGROUND OF THE INVENTION

US 2004/0005267 A1 discloses a method for making low sodium lithium carbonate from lithium containing brine. In the method a mother liquor containing carbonate from a prior precipitation step is added to brine to precipitate magnesium as magnesium carbonate; a solution of CaO and sodium carbonate is added to remove calcium and residual magnesium; lithium carbonate is precipitated from the purified brine by adding soda ash solution; the resultant solution is filtered to obtain solid lithium carbonate; an aqueous slurry of lithium carbonate is prepared in a reactor equipped with an inlet for introducing carbon dioxide gas into said aqueous slurry to form an aqueous lithium bicarbonate solution, said aqueous lithium bicarbonate solution is passed through filter and optionally through ion exchange column for further calcium and magnesium removal; said filtered lithium bicarbonate solution is introduced into a second reactor and adjusted to from 60 to 100° C. to precipitate ultra-pure lithium carbonate.

WO 2011/082444 A1 discloses a process for the production of lithium carbonate, the process comprises: calcining an alpha-spodumene ore or concentrate to produce beta-spodumene, sulphating at elevated temperature, passing the sulphated beta-spodumene to a leach step in which lithium sulphate is leached in water. The pregnant leach solution is passed to a series of impurity removal steps in which iron, alumina, silicates and magnesium are removed, adding sodium carbonate to the product for precipitating calcium, then ion exchanging for removing residual calcium, magnesium and other multivalent cations. The purified product is passed to lithium carbonate precipitation. The publication also discloses passing the precipitated lithium carbonate to a bicarbonate circuit, the bicarbonate circuit comprising digestion with carbon dioxide to produce bicarbonate intermediate and subsequent crystallisation to produce a lithium carbonate product.

Olivier, C. A and Nenninger, E. H, Continuous Process for the production of lithium carbonate, CIM Bulletin, July 1979, disclose a process for soda leaching of spodumene concentrate and carbonating under high pressure.

Galaxy Resources Limited has published a media release in November 2008 relating to preliminary test work to produce battery grade lithium carbonate using a 'Soda Ash' processing technique.

BRIEF DESCRIPTION OF THE INVENTION

An object of the present invention is thus to provide a method and an arrangement for recovering lithium carbonate with high yield and high purity. The objects of the invention are achieved by a method and an arrangement which is characterized by what is stated in the independent claims. The preferred embodiments of the invention are disclosed in the dependent claims.

The present invention relates to a method for recovering lithium carbonate from a raw material containing lithium. The method comprises the following steps of pulping the raw material containing lithium in the presence of water and sodium carbonate for producing a slurry containing lithium, leaching the slurry containing lithium in the presence of high pressure steam for producing a solution containing lithium carbonate, carbonating the solution containing lithium carbonate by using carbon dioxide under atmospheric conditions for producing a solution containing lithium bicarbonate, separating solids from the solution containing lithium bicarbonate by solid-liquid separation, purifying the solution containing lithium bicarbonate for producing a purified solution containing lithium bicarbonate, and recovering lithium carbonate by crystallising it from the purified solution containing lithium bicarbonate.

According to an embodiment of the present invention the raw material containing lithium can be any raw material from which it is desired to recover lithium. Typically the raw material containing lithium is selected from a group consisting of brine, a mineral containing lithium, spodumene, petalite or lepidolite or mixtures thereof.

According to an embodiment of the present invention the carbonating of the solution containing lithium carbonate is performed by using carbon dioxide in an excess amount.

According to an embodiment of the present invention the carbonating of the solution containing lithium carbonate is performed at ambient temperature, typically at the temperature of approximately 5 to 40° C.

According to an embodiment of the present invention the carbonating of the solution containing lithium carbonate is performed under atmospheric pressure.

According to an embodiment of the present invention the carbonating of the solution containing lithium carbonate is performed by feeding the carbon dioxide countercurrently with respect to the flow direction of the solution containing lithium carbonate.

According to an embodiment of the present invention the solids are separated from the solution containing lithium bicarbonate by any suitable solid-liquid separation method, typically by thickening and/or filtering.

According to an embodiment of the present invention the purifying of the lithium bicarbonate solution is performed by ion exchange, typically by using cation exchange resin.

According to an embodiment of the present invention the crystallising of the lithium carbonate is performed by heating the solution to a temperature of approximately the boiling point of the solution.

The present invention relates also to an arrangement for recovering lithium carbonate form a raw material containing lithium according to the above method, which arrangement comprises a pulping unit 1 for pulping the raw material containing lithium in the presence of water and sodium carbonate, a leaching unit 2 for leaching a slurry containing lithium in the presence of high pressure steam, a carbonating unit 3 for producing a solution containing lithium bicarbonate under atmospheric conditions in the presence of carbon dioxide, a solid-liquid-separation unit 4 for separating solids from the solution, a purifying unit 5 for producing a purified solution containing lithium bicarbonate, and a crystallising unit 6 for recovering lithium carbonate.

According to an embodiment of the invention the carbonating unit 3 comprises a mixer.

According to an embodiment of the invention the carbonating unit 3 is under atmospheric pressure.

According to an embodiment of the invention the carbonating unit 3 comprises at least one reactor or vessel. Typically the carbonating unit comprises two or more reactors or vessels.

BRIEF DESCRIPTION OF THE DRAWINGS

In the following the invention will be described in greater detail by means of preferred embodiments with reference FIG. 1, which shows a general flow diagram and arrangement of units of an embodiment of the invention.

DETAILED DESCRIPTION OF THE INVENTION

An embodiment of the method of the invention, as presented schematically in FIG. 1, is a method for recovering lithium carbonate from a raw material containing lithium, which method comprises pulping 1 the raw material containing lithium in the presence of water and sodium carbonate for producing a slurry containing lithium from the raw material containing lithium. After pulping the lithium-containing slurry is leached 2 for dissolving the lithium-containing mineral in the solution thus producing a solution containing lithium carbonate. After pulping and leaching the method comprises carbonating 3 the solution containing lithium carbonate by using carbon dioxide under atmospheric conditions for producing a solution containing lithium bicarbonate. Solids are separated from the solution by solid-liquid separation 4. The solution containing lithium bicarbonate is purified 5 to produce a purified solution containing lithium bicarbonate, and recovering by crystallising 6 lithium carbonate from the purified lithium bicarbonate-containing solution. The method of the invention enables production of battery-grade lithium carbonate with excellent yield and purity cost effectively in a continuous process.

The raw material containing lithium can be any suitable mineral containing lithium from which it is desired to recover lithium. Typically the raw material containing lithium is selected from a group consisting of brine, a mineral containing lithium, spodumene, petalite, lepidolite or mixtures thereof. Typically the lithium-containing raw material is spodumene.

According to an embodiment of the invention the method may also comprise steps for pretreating the lithium-containing raw material. If necessary, it is possible to perform a heat treatment of the lithium-containing raw material before pulping. For example, spodumene occurs in nature as α-spodumene, however it has to be converted into β-spodumene before pulping and leaching. For example, this can be performed by heating the α-spodumene or concentrate of α-spodumene to a temperature of approximately 1050° C. for a suitable period of time.

The pulping can be performed in any suitable vessel or reactor by contacting a feed containing lithium mineral with sodium carbonate and water for producing a slurry containing lithium.

The leaching of the slurry containing lithium is performed in a suitable autoclave or series of autoclaves with the presence of high-pressure steam. The leaching is typically performed at the temperature of 160 to 250° C.

The presence of sodium carbonate and process conditions result in the formation of lithium carbonate, which can be presented in the case of spodumene with the following formula (1).

$$2LiA(SiO_3)_2 + Na_2CO_3 = 2NaAl(SiO_3)_2 + Li_2CO_3 \qquad (1)$$

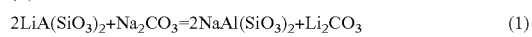

Before routing the formed lithium carbonate solution to the atmospheric carbonation it can optionally be diluted with water.

After pulping, leaching and optional diluting the formed solution containing solid and/or dissolved lithium carbonate is routed to bicarbonization step, wherein the lithium carbonate-containing solution is carbonated 3 by using carbon dioxide under atmospheric conditions for producing a solution containing lithium bicarbonate. Mixing is provided in the carbonating 3 by using any suitable mixer which provides mixing for dispersing gas, liquid and solids very efficiently. The lithium carbonate may be partly in a solid form due to low solubility and it is leached in the bicarbonization step, where relatively insoluble lithium carbonate is converted to more soluble bicarbonate by carbonating with carbon dioxide gas and water according to the reaction (2).

$$Li_2CO_3 + CO_2 + H_2O = 2LiHCO_3 \qquad (2)$$

The carbonating of the solution containing lithium carbonate is performed by using carbon dioxide in an excess amount. The carbonating of the solution containing lithium carbonate is performed typically at ambient temperature, more typically at the temperature of approximately 5 to 40° C. The carbonating of the solution containing lithium carbonate is performed under atmopspheric pressure, i.e. approximately 101.3 kPa. The carbonating is performed by feeding the carbon dioxide countercurrently with respect to the flow direction of the solution containing lithium carbonate.

When the method is carried out as a continuous process, at least one reactor or vessel is used for carrying out the bicarbonation. Typically the bicarbonation is performed by using at least two reactors or vessels.

Lithium bicarbonate containing solution is separated from the solids contained in the solution. The separation of lithium bicarbonate containing solution from the solids can be done with any suitable solid-liquid separation method. For example, the lithium bicarbonate solution can be routed to a thickener, from where the overflow can be routed directly to purification and the underflow can be filtered further in order to recover all lithium bicarbonate present in the solution.

After the solid-liquis-separation the solution containing lithium bicarbonate is purified by using a suitable purifying method. According to an embodiment of the invention, after the solid-liquid-separation the lithium bicarbonate solution is purified with ion exchange in order to remove impurities, especially trivalent and/or divalent metal ions, such as calcium, magnesium, aluminium and iron. The ion exchange can be performed for example by using a method disclosed in Finnish patent 121 785. Typically the purifying by ion exchange is performed by using cation exchange resin, wherein the cation exchange resin is for example iminodiacetic acid (IDA) or aminophosphonic acid (APA). Such resins are manufactured for example by Rohm & Haas under commercial names Amberlite IRC 748 (IDA) and Amberlite IRC 7476 (APA). Typically the cation exchange resin is a resin which has a polystyrenic matrix crosslinked with divinylbenzene containing aminophosphonic groups.

After the purifying, lithium carbonate is recovered by crystallising it by heating the lithium bicarbonate-containing solution in the crystallization unit. Lithium carbonate precipitates according to the reaction (3), when heat is applied to the solution containing lithium bicarbonate.

$$2LiHCO_3 + heat = Li_2CO_3 + CO_2 + H_2O \qquad (3)$$

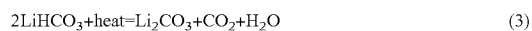

A slurry containing water and lithium carbonate precipitate is formed.

The solid lithium carbonate is filtered out from the obtained slurry and thus a battery-grade lithium carbonate is obtained. Standard battery grade lithium carbonate contains lithium carbonate at least 99.5%. However, it is possible to produce superior battery grade lithium carbonate containing at least 99.99% of lithium carbonate.

The present invention relates also to an arrangement for recovering lithium carbonate form a raw material containing lithium according to the method of the present invention. The referral numbers referring to FIG. 1 in connection with the description of the method correspond to the referral numbers used in connection with the description of the arrangement, thus the method steps of the method correspond to the units of the arrangement. The arrangement comprises

- a pulping unit 1 for pulping the raw material containing lithium in the presence of water and sodium carbonate,
- a leaching unit 2 for leaching a slurry containing lithium carbonate in the presence of high pressure steam,
- a carbonating unit 3 for producing a solution containing lithium bicarbonate under atmospheric conditions in the presence of carbon dioxide,
- a solid-liquid-separation unit 4 for separating solids from the solution containing lithium bicarbonate,
- a purifying unit 5 for producing a purified solution containing lithium bicarbonate, and
- a crystallising unit 6 for recovering lithium carbonate.

According to an embodiment the carbonating unit 3 comprises a mixer, which is capable of providing efficient mixing for dispersing gas, liquid and solids in the solution. In the arrangement the carbonating unit 3 is under atmospheric pressure and comprises at least one reactor or vessel, typically two or more reactors or vessels. Typically the solid-liquid-separation unit comprises a thickening unit and/or a filtering unit. Typically the purifying unit comprises an ion exchange unit.

The arrangement comprises all inlets, outlets and process instrumentation needed for carrying out the method of the invention.

It will be obvious to a person skilled in the art that, as the technology advances, the inventive concept can be implemented in various ways. The invention and its embodiments are not limited to the examples described above but may vary within the scope of the claims.

EXAMPLE

The soda process was tested by carrying out soda leach, atmospheric bicarbonization, solution purification by ion exchange and finally lithium carbonate was precipitated. The process was tested with lithium mineral concentrates (spodumene) containing 3.1 w % lithium.

The leaching is performed for the concentrate at 160 to 250° C. in an autoclave in a sodium carbonate solution.

Atmospheric bicarbonization was carried out in a batch reactor. The test system consisted of carbon dioxide gas feed, heating plate, reflux condenser, pH and redox detectors and agitator. The test was carried out at room temperature using a continuous $CO_2$ feed to the reactor.

It was noticed that atmospheric bicarbonization is a fast reaction provided there is a sufficient amount of $CO_2$ available.

After the bicarbonization, liquid was purified with ion exchange before crystallization.

Lithium carbonate is crystallized out of the lithium bicarbonate solution. The product analyses are presented in Table 1.

When gas formation was stopped, the slurry and crystals were collected and filtered and washed with water.

TABLE 1

| Impurity analysis of $Li_2CO_3$ crystals from the product solution | |
|---|---|
| Element % | $Li_2CO_3$ crystals from the solution |
| Cl— | <0.005 |
| Ca | <0.01 |
| Cu | <0.01 |
| Fe | <0.02 |
| K | <0.02 |
| Na | <0.01 |
| Mg | <0.01 |
| Mn | <0.01 |
| Ni | <0.01 |
| P | <0.02 |
| Pb | <0.01 |
| Zn | <0.01 |
| S(elem) | <0.05 |
| $SO_4^{2-}$ | <0.06 |

The invention claimed is:

1. A method for recovering lithium carbonate from a raw material containing lithium selected from the group consisting of brine, a mineral containing lithium, a mineral containing spodumene, a mineral containing petalite, a mineral containing lepidolite and mixtures thereof, wherein the method comprises
    pulping the raw material containing lithium in the presence of water and sodium carbonate to produce a slurry containing lithium,
    leaching the slurry containing lithium in the presence of high pressure steam to produce a solution containing lithium carbonate,
    carbonating the solution containing lithium carbonate by using carbon dioxide under atmospheric conditions to produce a solution containing lithium bicarbonate,
    separating solids from the solution containing lithium bicarbonate by solid-liquid separation,
    purifying the solution containing lithium bicarbonate by ion exchange to produce a purified solution containing lithium bicarbonate, and
    recovering lithium carbonate by crystallising same from the purified solution containing lithium bicarbonate.

2. The method according to claim 1, wherein the carbonating of the solution containing lithium carbonate is performed by using carbon dioxide in an excess amount.

3. The method according to claim 1, wherein the carbonating of the solution containing lithium carbonate is performed at the temperature of approximately from 5 to 40° C.

4. The method according to claim 1, wherein the carbonating of the solution containing lithium carbonate is performed under atmospheric pressure.

5. The method according to claim 1, wherein the carbonating of the solution containing lithium carbonate is performed by feeding the carbon dioxide counter currently with respect to the flow direction of the solution containing lithium carbonate.

6. The method according to claim 1, wherein the separating of the solids from the solution containing lithium bicarbonate is performed by thickening and/or filtering.

7. The method according to claim 1, wherein the ion exchange is performed by using cation exchange resin.

8. The method according to claim 1, wherein the crystallising of the lithium carbonate is performed by heating the solution containing lithium bicarbonate to a temperature of approximately the boiling point of the solution.

* * * * *